(12) United States Patent
Harrison et al.

(10) Patent No.: US 10,450,639 B2
(45) Date of Patent: Oct. 22, 2019

(54) HEAT TREATMENT TO IMPROVE JOINABILITY OF ALUMINUM SHEET

(71) Applicant: Ford Global Technologies, LLC, Dearborn, MI (US)

(72) Inventors: Nia R. Harrison, Ann Arbor, MI (US); S. George Luckey, Jr., Deaborn, MI (US); James Maurice Boileau, Novi, MI (US); Aindrea McKelvey Campbell, Beverly Hills, MI (US); Amanda Kay Freis, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 309 days.

(21) Appl. No.: 15/428,779

(22) Filed: Feb. 9, 2017

(65) Prior Publication Data

US 2017/0152590 A1   Jun. 1, 2017

Related U.S. Application Data

(62) Division of application No. 14/189,050, filed on Feb. 25, 2014, now Pat. No. 9,611,526.

(Continued)

(51) Int. Cl.
   *B32B 15/01*     (2006.01)
   *C22F 1/05*      (2006.01)
   (Continued)

(52) U.S. Cl.
   CPC ............ *C22F 1/05* (2013.01); *B32B 7/08* (2013.01); *B32B 15/016* (2013.01); *C22C 21/02* (2013.01);
   (Continued)

(58) Field of Classification Search
   None
   See application file for complete search history.

(56) References Cited

U.S. PATENT DOCUMENTS

| 4,589,932 A | 5/1986 | Park |
| 4,614,552 A | 9/1986 | Fortin et al. |

(Continued)

FOREIGN PATENT DOCUMENTS

| CN | 101168828 A | 4/2008 |
| DE | 10149178 A1 | 5/2002 |
| JP | 2002146462 A | 5/2002 |

OTHER PUBLICATIONS

Hoang, et al., "Self-piercing riveting connections using aluminum rivets", Elsevier Ltd. International Journal of Solids and Structures 47 (2010), pp. 427-439.

*Primary Examiner* — Daniel J. Schleis
(74) *Attorney, Agent, or Firm* — Ray Coppiellie; Brooks Kushman P.C.

(57) ABSTRACT

In at least one embodiment, an assembly is provided comprising a first member including a 6xxx series aluminum alloy heat treated to have a yield strength of at least 200 MPa and an r/t (bendability) ratio of up to 0.4. One or more members may be secured to the first member with a rivet (e.g., a self-piercing rivet). The heat treated alloy may have a yield strength of at least 260 MPa and may have a bendability ratio of up to 0.3. A method of forming an assembly is also provided, including heat treating a 6xxx series aluminum alloy to produce an alloy having a yield strength of at least 200 MPa and an r/t (bendability) ratio of up to 0.4 and riveting a member including the heat treated alloy to one or more additional members.

15 Claims, 10 Drawing Sheets

Related U.S. Application Data

(60) Provisional application No. 61/898,931, filed on Nov. 1, 2013.

(51) Int. Cl.
*C22F 1/04* (2006.01)
*C22C 21/02* (2006.01)
*C22C 21/08* (2006.01)
*B32B 7/08* (2019.01)
*C22F 1/047* (2006.01)
*F16B 19/04* (2006.01)

(52) U.S. Cl.
CPC ............... *C22C 21/08* (2013.01); *C22F 1/04* (2013.01); *C22F 1/047* (2013.01); *F16B 19/04* (2013.01); *Y10T 428/12347* (2015.01)

(56) References Cited

U.S. PATENT DOCUMENTS

| | | |
|---|---|---|
| 4,784,921 A | 11/1988 | Hyland et al. |
| 5,306,362 A | 4/1994 | Gupta et al. |
| 5,496,426 A | 3/1996 | Murtha |
| 5,582,660 A | 12/1996 | Erickson et al. |
| 5,752,305 A | 5/1998 | Cotterill et al. |
| 6,502,653 B1 | 1/2003 | Balzer et al. |
| 6,780,259 B2 | 8/2004 | Bull et al. |
| 8,496,764 B2 | 7/2013 | Luckey et al. |
| 2002/0121319 A1 | 9/2002 | Chakrabarti et al. |
| 2003/0029531 A1* | 2/2003 | Bull ................ C22C 21/02 148/551 |
| 2004/0068854 A1* | 4/2004 | Kato ................ B21J 15/025 29/432.2 |
| 2008/0185871 A1 | 8/2008 | Ishiyama et al. |
| 2012/0186706 A1 | 7/2012 | Krajewski |
| 2013/0228252 A1 | 9/2013 | Smeyers et al. |
| 2014/0290064 A1 | 10/2014 | Smeyers et al. |
| 2015/0004305 A1 | 1/2015 | Campbell et al. |
| 2015/0101718 A1 | 4/2015 | Harrison et al. |
| 2015/0129090 A1 | 5/2015 | Tundal et al. |

\* cited by examiner

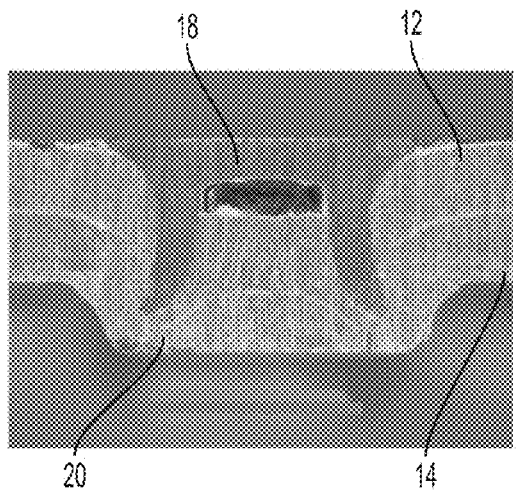 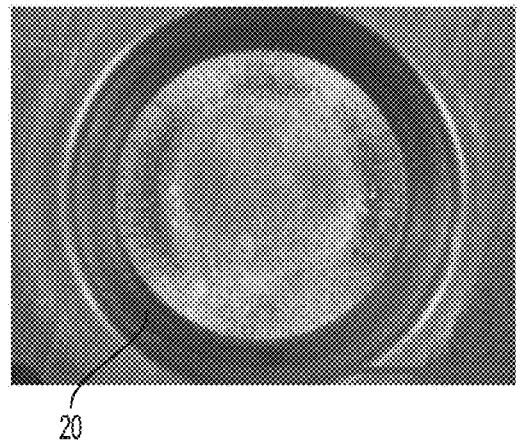
FIG. 7A            FIG. 7B
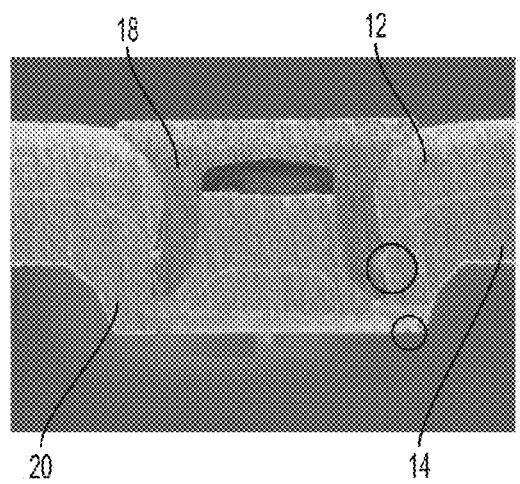 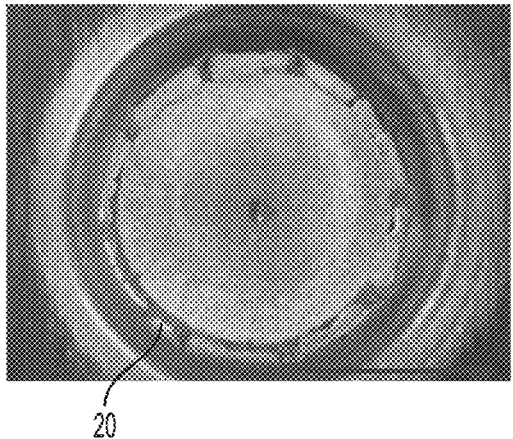
FIG. 8A            FIG. 8B

FIG. 15A

| | | | | | | | | | | | | | | |
|---|---|---|---|---|---|---|---|---|---|---|---|---|---|---|
| 0061 | 2.1 | 0 | 225 | 1.00 | | | | | | | | 0.300 | 0.025 | |
| 0061 | 2.1 | 0 | 225 | 2.00 | | | | | | | | 0.300 | 0.025 | |
| 0061 | 2.1 | 0 | 225 | 3.00 | | | | | | | | 0.300 | 0.030 | |
| 0061 | 2.5 | T4 | 225 | 4.00 | 217.2 | 220.0 | | | | less than | 0.28 | 0.300 | 0.030 | TRUE |
| 0061 | 2.5 | T4 | 225 | 6.00 | 205.9 | 210.7 | 213.6 | | | less than | 0.28 | 0.300 | 0.030 | TRUE |
| 0061 | 2 | T4 | 225 | 4.00 | 207.0 | 208.3 | 208.3 | | | less than | 0.30 | 0.300 | 0.024 | TRUE |
| 0061 | 2 | T4 | 225 | 6.00 | 205.8 | 202.2 | 207.7 | 4.44 | | less than | 0.30 | 0.300 | 0.024 | TRUE |
| 0061 | 1.8 | T4 | 225 | 4.00 | 224.7 | 218.7 | 202.0 | 4.44 | 4.44 | less than | 0.34 | 0.300 | 0.021 | TRUE |
| 0061 | 1.8 | T4 | 225 | 6.00 | 208.3 | 210.7 | 227.7 | | 4.44 | less than | 0.28 | 0.300 | 0.021 | TRUE |

FIG. 15B

HEAT TREATMENT TO IMPROVE JOINABILITY OF ALUMINUM SHEET

CROSS-REFERENCE TO RELATED APPLICATIONS

This application is a division of U.S. application Ser. No. 14/189,050 filed Feb. 25, 2014, now U.S. Pat. No. 9,611,526 issued Apr. 4, 2017, which, in turn, claims the benefit of U.S. provisional application Ser. No. 61/898,931 filed Nov. 1, 2013 the disclosures of which are hereby incorporated in their entirety by reference herein.

TECHNICAL FIELD

This disclosure relates to heat treatments to improve the joinability of aluminum sheet, for example, an over-aging heat treatment.

BACKGROUND

One approach to reducing vehicle weight in automotive design is with aluminum intensive vehicles (AIVs). AIVs have often been based on the unibody design of steel vehicle architectures, which are assemblies of stamped sheet components. Automotive AIV design has focused primarily on the 5xxx and 6xxx series aluminum sheet, as they can be shaped and processed by methods consistent with those already used in automotive manufacturing of steel sheet (e.g., sheet stamping, automated assembly, paint process). These alloys may have strengths equivalent to the mild steel sheet generally used in steel vehicle platforms. The 6xxx series aluminum alloys may experience improved mechanical strength properties when certain heat treatment processes are performed. For example, the T6-temper indicates the peak aging response of aluminum alloys. Designers often use this temper when strength of the material is being optimized.

SUMMARY

In at least one embodiment, an assembly is provided comprising a first member including a 6xxx series aluminum alloy. The alloy may be heat treated to have a yield strength of at least 200 MPa and an r/t (bendability) ratio of up to 0.4. A rivet may secure the first member to one or more additional members.

The rivet may maintain intimate contact with the 6xxx series aluminum alloy. In one embodiment, the rivet is a self-piercing rivet (SPR). A button formed by the SPR may be formed in the 6xxx series aluminum alloy, with substantially no cracking in the button. In one embodiment, the 6xxx series aluminum alloy has an r/t ratio of up to 0.3. The 6xxx series aluminum alloy may be a 6061 alloy or a 6111 alloy and may be heat treated to a T7 or T8 temper. In one embodiment, the 6xxx series aluminum alloy may have been heat treated to have a yield strength of at least 260 MPa. In one embodiment, the assembly may include up to four members joined by the rivet. The first member and the one or more additional members are each formed of a 6xxx series aluminum alloy heat treated to have a yield strength of at least 200 MPa and an r/t (bendability) ratio of up to 0.4. The first member and the one or more additional members may each have a thickness of 0.8 to 4 mm.

In at least one embodiment, a method of joining an aluminum alloy to an automotive assembly is provided. The method may include heat treating a 6xxx series aluminum alloy at a temperature of 220° C. to 240° C. for 30 minutes to 7 hours to produce an alloy having a yield strength of at least 200 MPa and an r/t (bendability) ratio of up to 0.4. The method may further include riveting a first member including the heat treated alloy to one or more additional members.

The riveting may be done using self-piercing rivets (SPRs). In one embodiment, the heat treating step has a duration of 5 to 7 hours. The heat treating step may include heat treating the 6xxx series aluminum alloy to a T7 temper having an r/t ratio of up to 0.3. In another embodiment, the heat treating step may have a duration of 30 to 90 minutes. The heat treating step may include heat treating the 6xxx series aluminum alloy to a T8 temper having a yield strength of at least 260 MPa.

In at least one embodiment, an assembly is provided comprising a first member including a 6xxx series aluminum alloy heat treated to have a yield strength of at least 200 MPa and an r/t (bendability) ratio of up to 0.4. One or more additional members may be secured to the first member with a self-piercing rivet (SPR), the SPR extending through the one or more additional members and maintaining intimate contact with the 6xxx series aluminum alloy. A button may be formed in the 6xxx series aluminum alloy and the SPR may terminate in the button. The 6xxx series aluminum alloy may also have been heat treated to have a yield strength of at least 260 MPa.

BRIEF DESCRIPTION OF THE DRAWINGS

FIGS. 7A and 7B are cross-section and bottom views, respectively, of an assembly including a 1.8 mm 6111 aluminum alloy having an r/t ratio of 0.28 joined by a self-piercing rivet (SPR);

FIGS. 8A and 8B are cross-section and bottom views, respectively, of an assembly including a 1.8 mm 6111 aluminum alloy having an r/t ratio of 0.71 joined by a self-piercing rivet (SPR);

FIGS. 15A and 15B are a table including yield strength and bendability data for 6061 alloys after multiple heat treatments.

DETAILED DESCRIPTION

Figure 1:
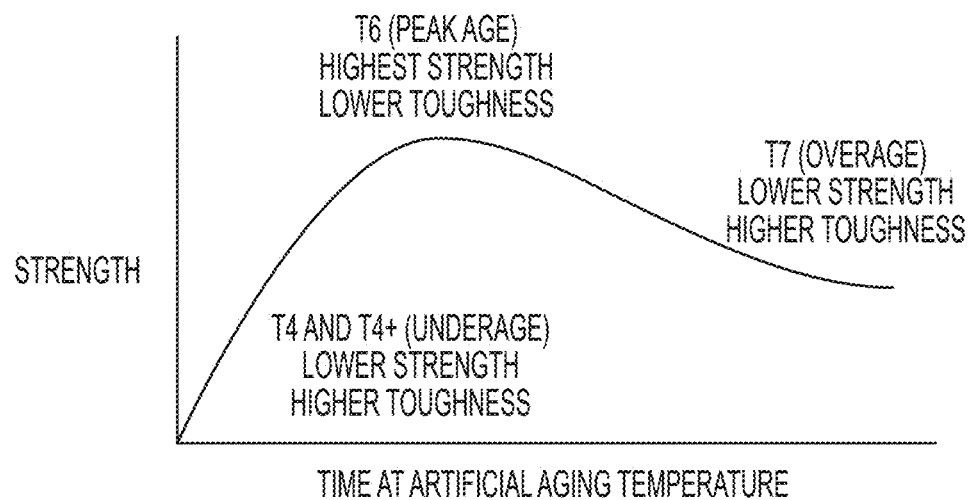
FIG. 1 is a schematic graph of strength versus artificial aging time showing several tempering stages of aluminum alloys.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Aluminum alloys are generally identified by a four-digit number, wherein the first digit generally identifies the major alloying element. Additional numbers represented by the letter "x" in the series designation define the exact aluminum alloy. For example, the major alloying element of 5xxx series is magnesium and for 6xxx series they are magnesium and silicon. 5xxx and 6xxx series aluminum alloys, which are aluminum-magnesium and aluminum-magnesium-silicon alloys, respectively. The 5xxx and 6xxx series aluminum alloys may be shaped and processed by methods consistent with those of mild steel sheets. The 7xxx series, which generally have high strengths, have aluminum and zinc as the major alloying elements.

Examples of specific 6xxx series alloys may include 6061, which may have a composition including 0.4-0.8% silicon, up to 0.7% iron, 0.15-0.40% copper, up to 0.15% manganese, 0.8-1.2% magnesium, 0.04-0.35% chromium, up to 0.25% zinc, up to 0.15% titanium, and other elements up to 0.05% each (0.15% total), all percentages by weight with the balance being aluminum. Numerous automotive components may include 6061 aluminum, such as brackets, body components, fasteners, and others. Another specific example of a 6xxx series alloy may be 6111, which may have a composition including 0.5-1% magnesium, 0.6-1.1% silicon, 0.5-0.9% copper, 0.1-0.45% manganese, up to 0.4% iron, up to 0.15% zinc, up to 0.1% chromium, up to 0.1% titanium and other elements up to 0.05% each (0.15% total), all percentages by weight with the balance being aluminum. Numerous automotive components may include 6111 aluminum, such as body panels, pillars, and others. Components including 6111 aluminum may require higher yield strength than those including 6061 aluminum. Other specific 6xxx series alloys are known in the art, such as 6009, 6010, 6016, 6022, 6053, 6063, 6082, 6262, 6463, or others.

6xxx and 7xxx series aluminum alloys may be age hardened (precipitation hardened) to increase their strength and/or toughness. Age hardening is preceded by a solution heat treatment (or solutionizing) and quench of the aluminum alloy material. A solution treatment generally includes heating the alloy to at least above its solvus temperature and maintaining it at the elevated temperature until the alloy forms a homogeneous solid solution or a single solid phase and a liquid phase. The temperature at which the alloy is held during solutionizing is known as the solution temperature. For example, the solution temperature for a 6xxx series aluminum alloy may be approximately 510° C. to 580° C. and the solution treatment may last from about 1 minute to two hours depending on the efficiency of furnace system and form of the aluminum being solution heat treated (e.g., sheet coil or sheet stampings). The solution temperature for a 7xxx series aluminum alloy may be approximately 460° C. to 490° C. and the solution treatment may last from about 5 to 45 minutes. However, any suitable solution temperature and/or time may be used for a given aluminum alloy. The solution temperature may be the temperature at which a substance is readily miscible. Miscibility is the property of materials to mix in all proportions, forming a homogeneous solution. Miscibility may be possible in all phases; solid, liquid and gas.

Following the solution treatment, a quenching step is performed in which the alloy is rapidly cooled to below the solvus temperature to form a supersaturated solid solution. Due to the rapid cooling, the atoms in the alloy do not have time to diffuse long enough distances to form two or more phases in the alloy. The alloy is therefore in a non-equilibrium state. Quenching may be done by immersing the alloy in a quenching medium, such as water or oil, or otherwise applying the quenching medium (e.g., spraying). Quenching may also be accomplished by bringing the alloy into contact with a cooled surface, for example, a water-cooled plate or die. The quench rate may be any suitable rate to form a supersaturated solution in the quenched alloy. The quench rate may be determined in a certain temperature range, for example from 400° C. to 290° C. In at least one embodiment, the quench rate is at least 100° C./sec. The quench may be performed until the alloy is at a cool enough temperature that the alloy stays in a supersaturated state (e.g., diffusion is significantly slowed), such as about 290° C. The alloy may then be air cooled or otherwise cooled at a rate slower than the quench rate until a desired temperature is reached. Alternatively, the quench may be performed to a lower temperature, such as below 100° C. or down to about room temperature.

Age hardening includes heating and maintaining the alloy at an elevated temperature at which there are two or more phases at equilibrium. The supersaturated alloy forms fine, dispersed precipitates throughout as a result of diffusion within the alloy. The precipitates begin as clusters of atoms, which then grow to form GP zones, which are on the order of a few nanometers in size and are generally crystallographically coherent with the surrounding metal matrix. As the GP zones grow in size, they become precipitates, which strengthen the alloy by impeding dislocation movement. Since the precipitates are very finely dispersed within the alloy, dislocations cannot move easily and must either go around or cut through the precipitates in order to propagate.

Five basic temper designations may be used for aluminum alloys which are; F—as fabricated, O—annealed, H—strain hardened, T—thermally treated, and W—as quenched (between solution heat treatment and artificial or natural aging). The as-received raw material for the disclosed solutionizing and age hardening processes may initially have any of the above temper designations. The temper designation may be followed by a single or double digit number for further delineation. An aluminum alloy with a T6 temper designation may be an alloy which has been solution heat treated and artificially aged, but not cold worked after the solution heat treatment (or such that cold working would not be recognizable in the material properties). T6 may represent the point of peak age yield strength along the yield strength vs. time and temperature profile for the material. A 6xxx series aluminum alloy having a T6 temper may have a yield strength of at least 240 MPa. For example, 6061 at a T6 temper may have a yield strength of about 275 MPa and 6111 at a T6 temper may have a yield strength of about 300 MPa. A T7 temper may designate that a solution heat treatment has occurred, and that the material was artificially aged beyond the peak age yield strength (over-aged) along the yield strength vs. time and temperature profile. A T7 temper material may have a lower yield strength than a T6 temper material, but the T7 temper may improve other properties, such as increased corrosion performance compared to the T6 temper (e.g., for 7xxx series alloys). A T8 temper is similar to a T7 temper in that it is aged beyond the peak yield strength (e.g., T6), however, a material with a T8 temper is artificially aged after the material has been cold worked. For example, sheets of 6111 alloy may be stamped in a T4 temper and then age hardened to T8, thereby forming a T8 temper.

The relative strengths and toughnesses of 6xxx series aluminum alloys as a function of aging time are illustrated in FIG. 1. As discussed above, T6 represents peak aging and the highest yield strength, while T7 represents over-aging and reduced (but still improved) yield strength. The T8 temper is not shown on the graph, but is similar to T7 in that it has lower yield strength than the T6 and lies to the right of the T6 peak-age. The T4 temper is shown to the left of peak aging, and may have properties similar to T7/8 (e.g., reduced strength and increased toughness relative to T6), but represents under-aging rather than over-aging. Under-aging to a T4 temper may be substituted for age hardening to T7 or T8 tempers in the present disclosure, however, under-aging may be more difficult to control and repeat. Therefore, over-aging may be a more robust and consistent process compared to under-aging.

To achieve a T6 temper in a 6xxx series alloy, a solution heat treatment and quench is performed, as described above, followed by an age hardening heat treatment. The standard age hardening heat treatment to achieve a T6 temper in a 6xxx alloy may be at a temperature of about 160° C. to 180° C. for 8 to 18 hours (generally, if the temperature is near the top of the range then the time is towards the bottom of the range, and vice versa). However, there is no industry standard for tempering a 6xxx alloy to a T7 or T8 temper (e.g., no ASTM standard or military spec).

It has been discovered that T7 and T8 tempers can be achieved in a 6xxx alloy in less time than the standard T6 temper. As discussed above, the T7 temper is also called "over-aged," since it is aged passed the peak age corresponding to T6. Therefore, the T7 temper typically requires aging beyond the T6 temper. However, it has been found that by aging at an increased temperature compared to the standard age hardening process, the time needed to reach a T7 or T8 temper may be reduced and may be less than the standard time for a T6 temper. In at least one embodiment, a T7 or T8 temper 6xxx series aluminum alloy may be formed by heat treating the alloy at a temperature of 215° C. to 245° C. The temperature may include any sub-range of the above temperature range, for example, 220-240° C., 225-235° C., or others. The 6xxx series alloy may be heat treated in the above temperature range for 15 minutes to 8 hours. However, the treatment time may include any sub-range of the above times, for example, 30 minutes to 7 hours, 1-6 hours, 1-5 hours, or others. The heat treatment time may be at the higher or lower end of the above ranges based on the specific 6xxx alloy (e.g., 6061 vs. 6111), the desired yield strength, the level of robustness desired in the process, or other factors.

In one embodiment, a T7 temper 6xxx series alloy (e.g. 6061) may formed by heat treating the alloy at a temperature of 215° C. to 245° C. The temperature may include any sub-range of the above temperature range, for example, 220-240° C., 225-235° C., or others. In one embodiment, the age hardening temperature is about 230° C. The 6xxx series alloy may be heat treated in the above temperature range for 1 to 8 hours. However, the treatment time may include any sub-range of the above times, for example, 1-7 hours, 2-6 hours, 3-6 hours, 4-6 hours, or others. In one embodiment, the age hardening heat treatment lasts about 6 hours.

In another embodiment, a T8 temper 6xxx series alloy (e.g. 6111) may be formed by heat treating the alloy at a temperature of 210° C. to 240° C. The temperature may include any sub-range of the above temperature range, for example, 215-235° C., 220-230° C., or others. In one embodiment, the age hardening temperature is about 225° C. The 6xxx series alloy may be heat treated in the above temperature range for 30 to 90 minutes. However, the treatment time may include any sub-range of the above times, for example, 45-75 minutes, 50-70 minutes, or others. In one embodiment, the age hardening heat treatment lasts about 1 hour. The reduced age hardening time for the T8 temper may be due to the alloys having a higher copper content, which results in higher hardening kinetics during heat treatment. For example, copper is a key alloying element in 6111 aluminum, enabling the higher heat treated yield strength compared to, for example, 6061.

T7 and T8 temper aluminum alloys (e.g., 5xxx, 6xxx, and 7xxx) generally have increased bending toughness compared to the T6 temper. One method of measuring toughness may include determining the type of failure that a component exhibits after deformation. For example, when a sheet or coupon of material is bent to failure, the failure may be transgranular or intergranular. Transgranular failure, or failure across or through the grains of the alloy may indicate higher toughness than intergranular failure, where failure occurs along grain boundaries (e.g., between grains). Intergranular failure may occur when the grain boundaries are brittle or weak, which may be due to alloy composition, the type of heat treatment, or other factors (or a combination thereof). The T7 and T8 alloys disclosed herein may exhibit transgranular failure rather than intergranular failure during bending due to their increased toughness (e.g., compared to T6).

While the bending toughness of the T7 and T8 tempers may be greater than that of a T6 temper, a 6xxx series aluminum at a T7 or T8 temper may have a lower yield strength than a T6 temper due to over-aging. However, 6xxx series alloys age hardened according to the above embodiments may maintain a yield strength of at least 200 MPa. For example, certain alloys (e.g., 6061) age hardened to a T7 or T8 temper (e.g., using the age hardening treatments described above) may have a yield strength of at least 200, 210, 220, 230, 240 MPa or higher. Some alloys (e.g., 6111) may have higher yield strengths following an age hardening heat treatment (e.g., as described above), for example, at least 250, 260, 270, 280, 290 MPa or higher.

Figure 2:
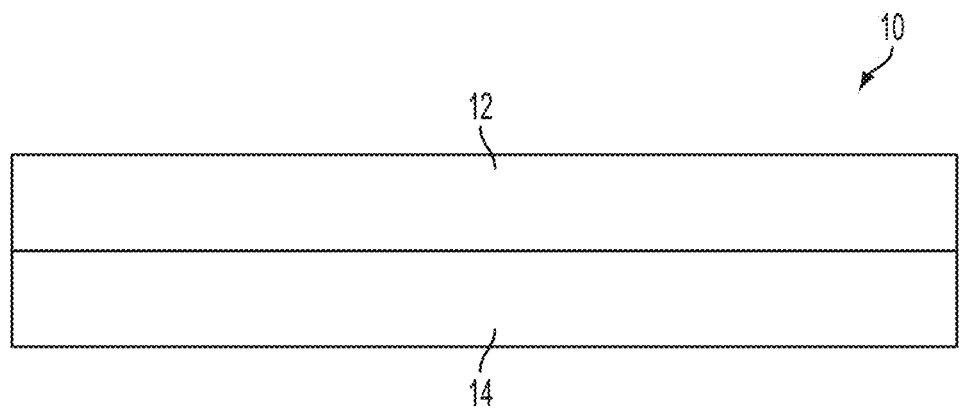
FIG. 2 is a schematic cross-section of an assembly of two members to be joined, according to an embodiment.

In order to be used in certain vehicle applications, aluminum alloys (e.g., 6xxx series) must be able to be joined to other metal components. With respect to FIG. 2, a stack 10 of members or layers is shown. The stack 10 may have a top member 12 and a bottom member 14. In addition, there may be additional intermediate members/layers (not shown) in between the top member 12 and bottom member 14. In one embodiment, the stack 10 has up to four layers: a top layer 12, a bottom layer 14, and one or two intermediate layers. At least one of the layers may be a 6xxx series aluminum alloy, which may have a T7 or T8 temper. In at least one embodiment, the bottom layer 14 is a 6xxx series aluminum alloy, which may have a T7 or T8 temper and the properties described above. The top layer 12, bottom layer 14, and any intermediate layer(s) may be formed of the same material (e.g., a T7 or T8 temper 6xxx alloy). However, the one or more of the layers may be formed of different materials, such as other aluminum alloys or steels. The stack 10 may have a total thickness of up to 6, 8, 10, or 12 mm. Each layer may have a thickness of 0.5 to 5 mm, or any sub-range therein, such as 0.8 to 4 mm, 1 to 3.5 mm, or others. In one embodiment, the bottom layer 14 may be thicker than each of the other layers (however, it is not required to be thicker). For example, the bottom layer 14 may have a thickness of 1.5 to 4 mm, or any sub-range therein.

The ability of an aluminum alloy component or member to be joined to other components or members may be described as its "joinability." One method of joining components to one another is riveting. Traditional rivets have a head and a cylindrical body, the body is inserted into a hole in the components to be joined and then deformed to form a second head. Self-piercing rivets (SPRs) 18 are another form of rivets in which no pre-formed holes in the components to be joined are necessary. SPRs 18 generally include a hardened, semi-tubular body that is inserted into the top component(s) 12 to be joined, but does not penetrate all the way through the bottom component 14. A bottom die is placed below the bottom component 14, which causes the SPR 18 to flare and form an annular button 20 on the bottom component 14 (for example, as shown in FIGS. 3A-3C and 4A-4C).

Figure 3A:
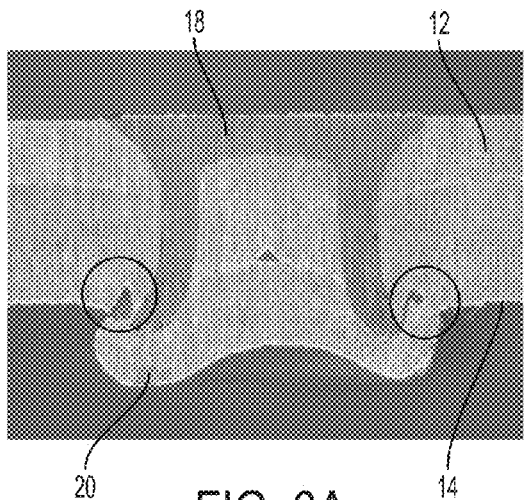
FIG. 3A is a cross-section of an assembly including an aluminum alloy having a T6 temper joined by a self-piercing rivet (SPR)
Figure 3B:
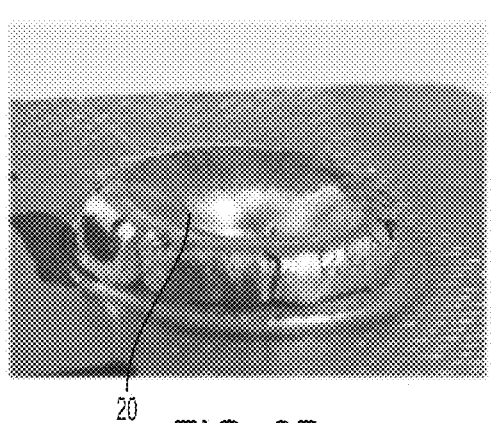
FIGS. 3B and 3C are oblique and bottom views, respectively, of the assembly of FIG. 3A.
Figure 3C:
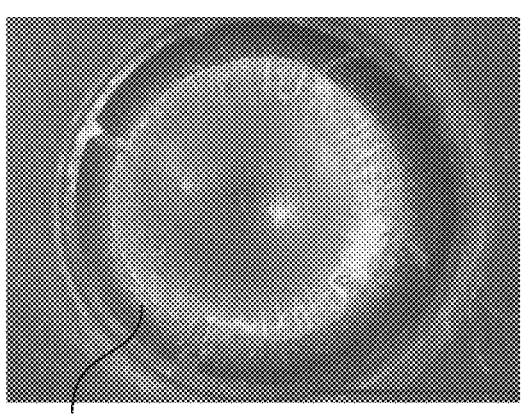

It has been found that the use of SPRs 18 may not be feasible with 6xxx series aluminum alloys having a T6 temper. As shown in FIGS. 3A-3C, numerous joining defects may occur when using SPRs 18 on a stack having a T6 temper 6061 alloy as the bottom layer 14. As shown in FIG. 3A, cracking within the stack 10 may occur. The bottom layer 14 may crack and at least partially separate around the edge of the button 20. As shown in FIG. 3B, the button 20 itself may crack, for example, in the side wall. Radial cracking of the button 20 may also occur, as shown in FIG. 3C. In addition, the legs of the SPR 18 may buckle.

Figure 4A:
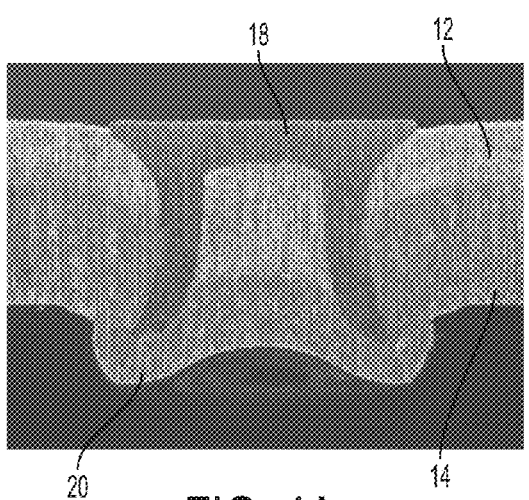
FIG. 4A is a cross-section of an assembly including an aluminum alloy having a T7 temper joined by a self-piercing rivet (SPR)
Figure 4B:
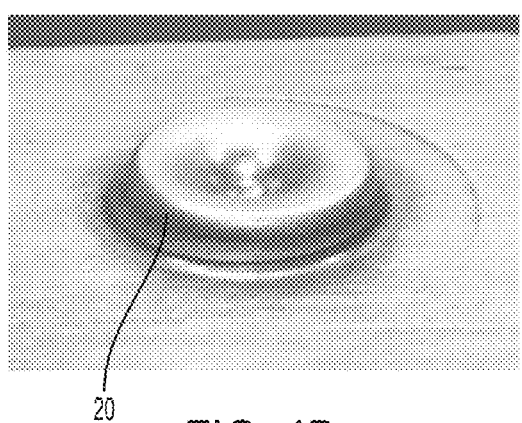
FIGS. 4B and 4C are oblique and bottom views, respectively, of the assembly of FIG. 4A.
Figure 4C:
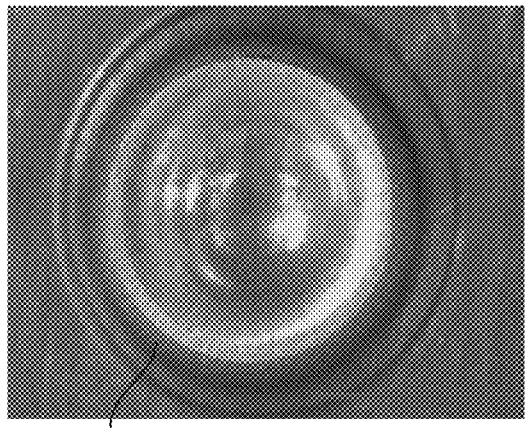

It has been discovered, however, that 6xxx series alloys having a T7 or T8 temper may have increased joinability, for example, with SPRs 18. Without being held to any particular theory, it is believed that the increased bending toughness of the T7/T8 temper alloys compared to the T6 temper alloys may improve the joinability. FIGS. 4A-4C show 6061 series alloys having a T7 temper joined to another metal component using SPRs 18 at similar angles and views as FIGS. 3A-3C, for comparison. As shown in FIGS. 4A-4C, cracking in the stack 10 may be avoided, as well as cracks in the button 20 (both in the side wall and radial cracks). In addition, FIGS. 4A-4C show that the rivet (e.g., a SPR) may remain in intimate contact with the 6xxx aluminum alloy after riveting. Stated another way, the rivet may be in substantially continuous contact with the 6xxx aluminum alloy along the portion of the surface of the rivet that is embedded in the 6xxx alloy. For example, there may be no cracks in the 6xxx alloy or the SPR and/or no gaps between the 6xxx alloy and the surface of the SPR.

Figure 5:
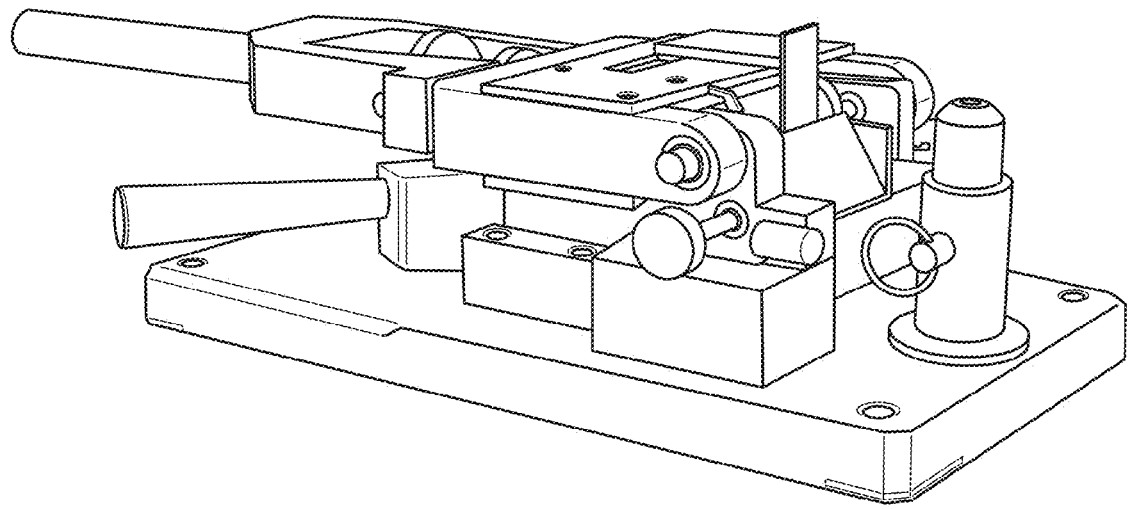
FIG. 5 is a photograph of a semi-guided wrap-bend tester, which may be used to test bendability of an aluminum alloy.
Figure 6:
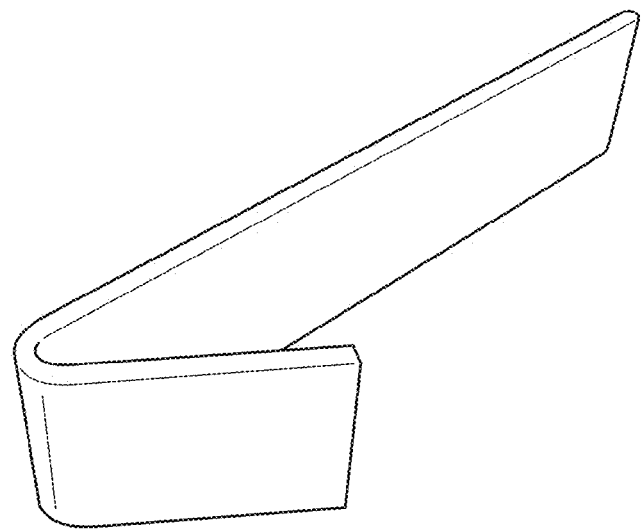
FIG. 6 is an example of a coupon tested using the wrap-bend tester of FIG. 5.

In addition, it has been discovered that joinability (e.g., ability to be riveted) may be correlated to and/or predicted by bendability measurements. Bendability, as used in the present disclosure, may be quantified using an "r/t ratio," which is the ratio of the bend radius (r) to the sheet thickness (t). The smaller the r/t ratio, the more bendable the sheet is. An example of a piece of equipment used to measure bendability is shown in FIG. 5. The equipment shown is a semi-guided wrap-bend tester, which adheres to standards such as ASTM E290 and FORD Laboratory Test Method (FLTM) B114-02. Bendability may be defined and measured according to FLTM BB 114-02 and the r/t ratio may be calculated based on a prescribed bend rating. In at least one embodiment, the r/t ratio to failure may be calculated based on a bend rating of about 5 or more where a crack completely propagates across the width of the bent sample. The r/t to failure calculation may be considered a normalized, relative mechanical assessment of an aluminum alloy's toughness. An example of a coupon tested using the wrap-bend tester is shown in FIG. 6. In general, it has been discovered that 6xxx series aluminum alloys (e.g., 6061 and 61111) having a bendability r/t ratio of about 0.3 or less may be joined using SPRs without the above mentioned defects (e.g., stack or button cracking). Certain alloys may be joinable at higher r/t ratios, for example, 6111 alloys may be joinable at r/t ratios of up to about 0.4. Joinability may be possible at r/t ratios higher than 0.4, however the riveting process may not be robust at higher r/t ratios, which may lead to an unacceptable failure rate.

Examples of the impact of r/t ratio on the joinability of 6xxx series alloys are shown in FIGS. 7-14. The stacks shown in FIGS. 7-14 each include a top and bottom layer of 6111 aluminum alloy. FIGS. 7A and 7B show a cross-section and bottom view, respectively of a stack including two 1.8 mm 6111 alloy sheets joined to each other using an SPR. The each sheet in FIGS. 7A and 7B had an r/t ratio of 0.28 and the stack shows no defects in the stack or the SPR. In comparison, another pair of 1.8 mm 6111 alloy sheets that received a different heat treatment and were joined to each other using an SPR is shown in FIGS. 8A and 8B. The sheets in FIGS. 8A and 8B had an r/t ratio of 0.71 and cracks can be seen in the stack and in the button.

Figure 9A:
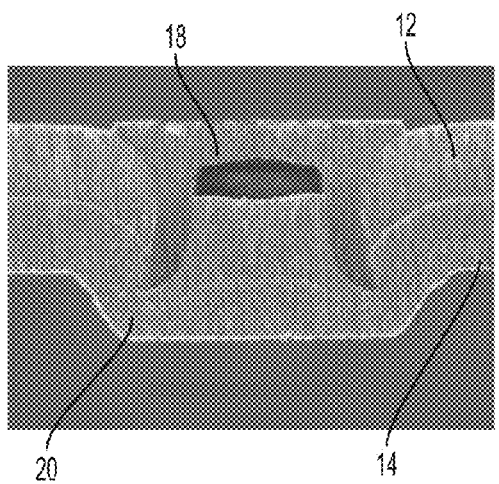
FIGS. 9A and 9B are cross-section and bottom views, respectively, of an assembly including a 2.0 mm 6111 aluminum alloy having an r/t ratio of 0.25 joined by a self-piercing rivet (SPR)
Figure 9B:
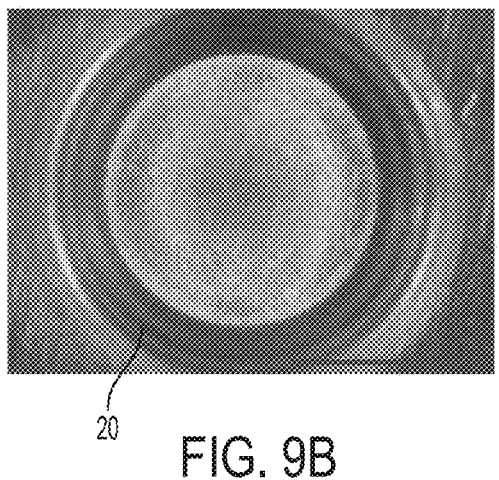
Figure 10A:
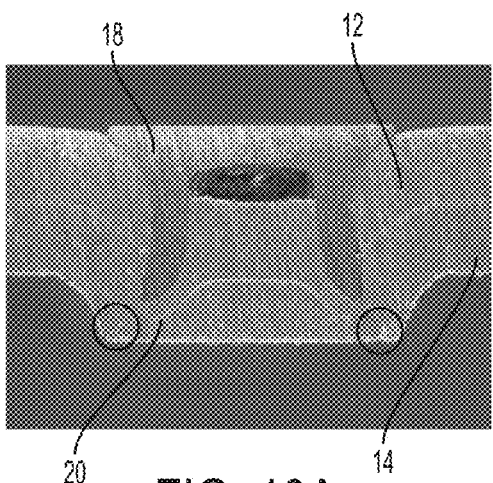
FIGS. 10A and 10B are cross-section and bottom views, respectively, of an assembly including a 2.0 mm 6111 aluminum alloy having an r/t ratio of 0.64 joined by a self-piercing rivet (SPR)
Figure 10B:
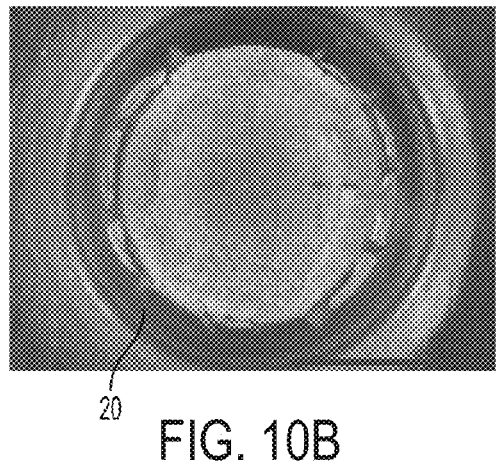

FIGS. 9A and 9B show a cross-section and bottom view, respectively of a stack including two 2.0 mm 6111 alloy sheets joined to each other using an SPR. The sheets in FIGS. 9A and 9B had an r/t ratio of 0.25 and the stack shows no defects in the stack or the SPR. In comparison, another pair of 2.0 mm 6111 alloy sheets that received a different heat treatment and were joined to each other using an SPR is shown in FIGS. 10A and 10B. The sheets in FIGS. 10A and 10B had an r/t ratio of 0.64 and cracks can be seen within the button and circumferentially.

Figure 11A:
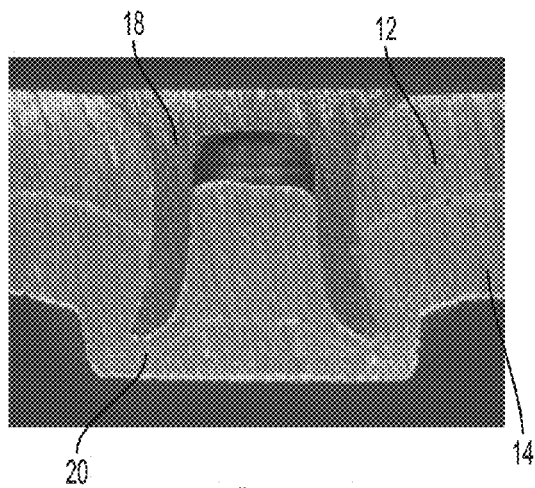
FIGS. 11A and 11B are cross-section and bottom views, respectively, of an assembly including a 2.7 mm 6111 aluminum alloy having an r/t ratio of 0.3 joined by a self-piercing rivet (SPR)
Figure 11B:
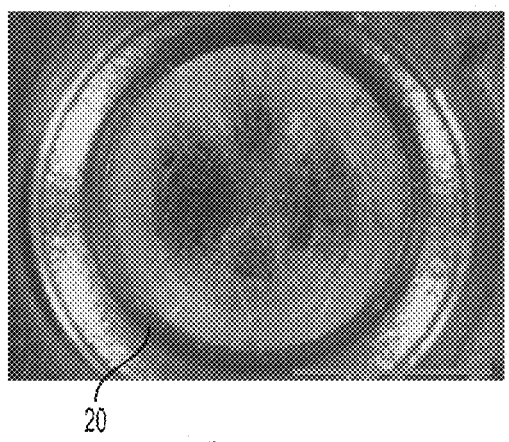
Figure 12A:
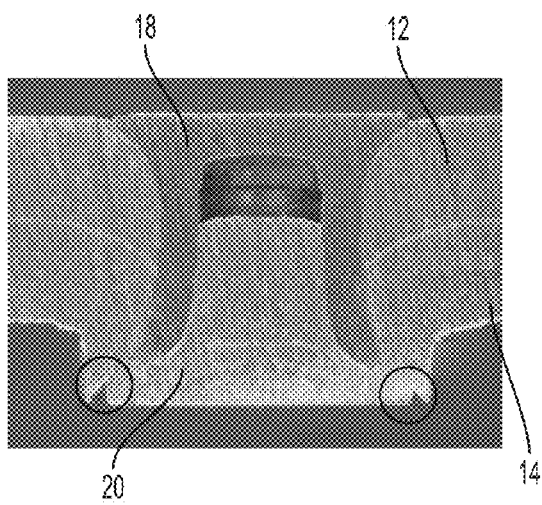
FIGS. 12A and 12B are cross-section and bottom views, respectively, of an assembly including a 2.7 mm 6111 aluminum alloy having an r/t ratio of 0.75 joined by a self-piercing rivet (SPR)
Figure 12B:
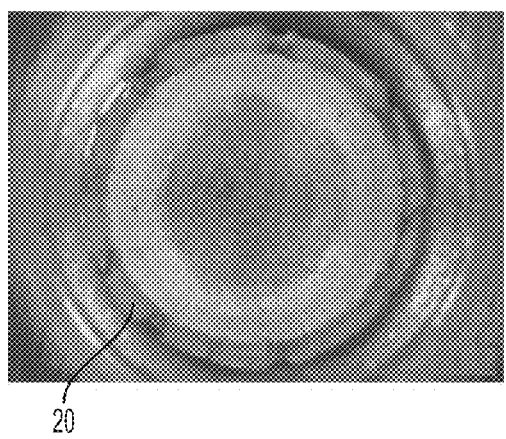

FIGS. 11A and 11B show a cross-section and bottom view, respectively of a stack including two 2.7 mm 6111 alloy sheets joined to each other using an SPR. The sheets in FIGS. 11A and 11B had an r/t ratio of 0.3 and the stack shows no defects in the stack or the SPR. In comparison, another pair of 2.7 mm 6111 alloy sheets that received a different heat treatment and were joined to each other using an SPR is shown in FIGS. 12A and 12B. The sheets in FIGS. 12A and 12B had an r/t ratio of 0.75 and cracks can be seen within the button and circumferentially.

Figure 13A:
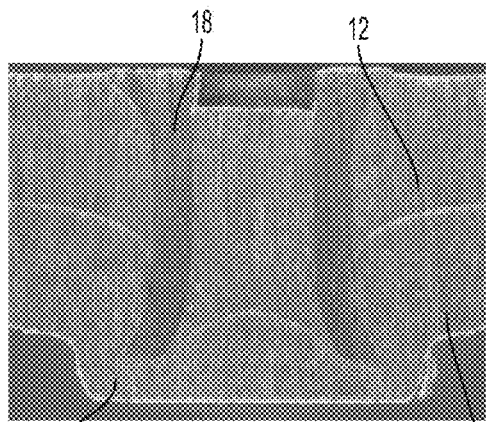
FIGS. 13A and 13B are cross-section and bottom views, respectively, of an assembly including a 3.5 mm 6111 aluminum alloy having an r/t ratio of 0.23 joined by a self-piercing rivet (SPR)
Figure 13B:
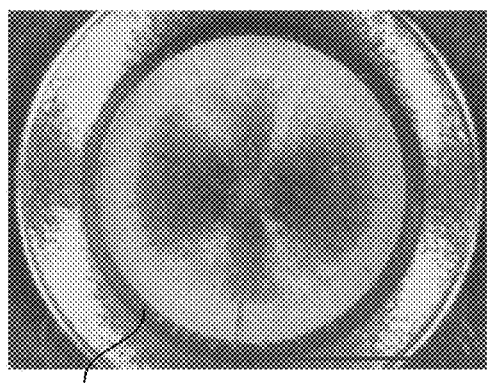
Figure 14A:
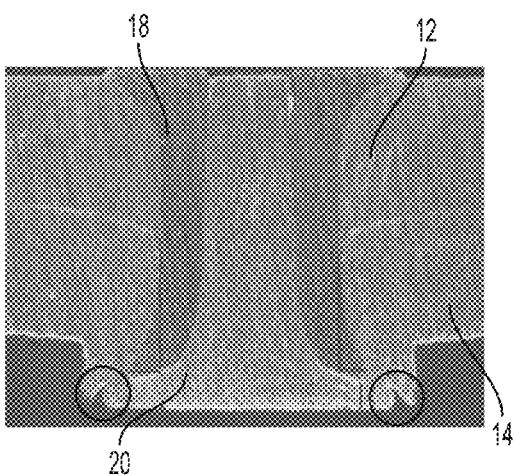
FIGS. 14A and 14B are cross-section and bottom views, respectively, of an assembly including a 3.5 mm 6111 aluminum alloy having an r/t ratio of 0.65 joined by a self-piercing rivet (SPR)
Figure 14B:
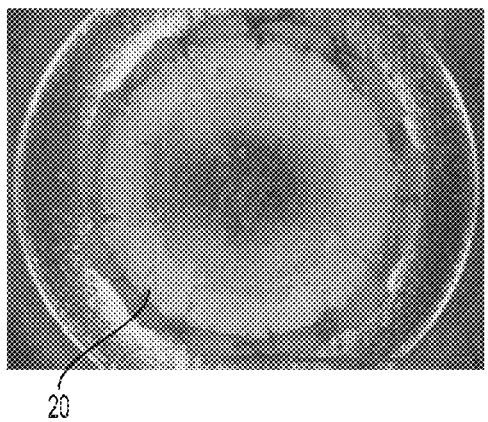

FIGS. 13A and 13B show a cross-section and bottom view, respectively of a stack including two 3.5 mm 6111 alloy sheets joined to each other using an SPR. The sheets in FIGS. 13A and 13B had an r/t ratio of 0.23 and the stack shows no defects in the stack or the SPR. In comparison, another pair of 3.5 mm 6111 alloy sheets that received a different heat treatment and were joined to each other using an SPR is shown in FIGS. 14A and 14B. The sheets in FIGS. 14A and 14B had an r/t ratio of 0.65 and cracks can be seen within the button and circumferentially. 6xxx series aluminum sheets having r/t ratios of up to 0.3 or 0.4 may be produced according to the age hardening treatments disclosed above (e.g., T7 and T8 tempers). The T7 and/or T8 temper 6xxx alloys may therefore be joinable using SPRs without cracking the stack or the button. However, it may be possible to produce 6xxx alloys having r/t ratios of up to 0.3 or 0.4 by other methods. Regardless of how the 6xxx series alloy sheet has been processed, if the r/t ratio is up to 0.3 then it is highly probable that the sheet may be riveted using SPRs.

Figure 15A:
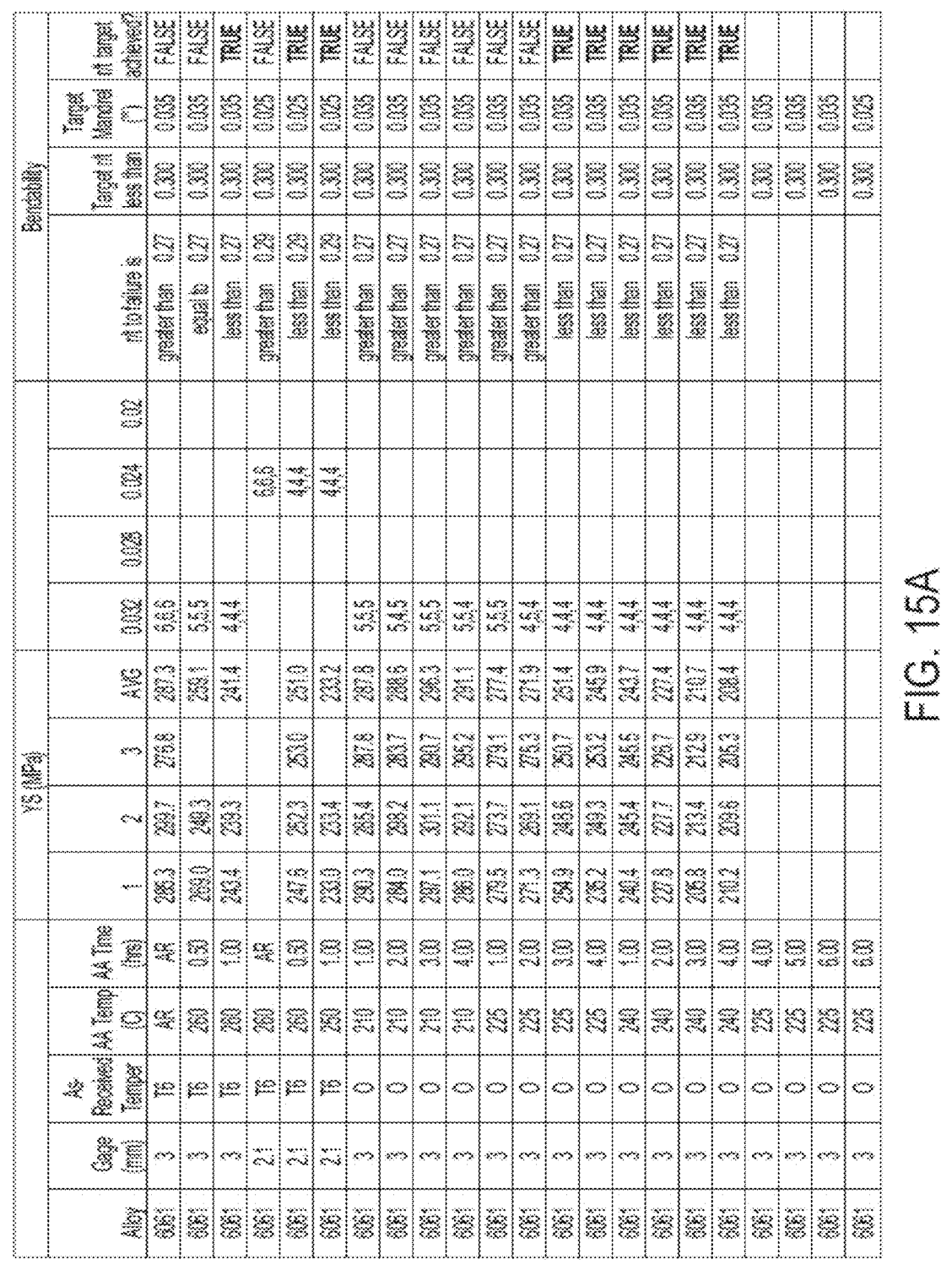

With respect to FIGS. 15A and 15B, a table is shown including yield strength and bendability data for multiple heat treatments performed on 6061 alloys. The artificial aging tests were performed with temperatures of 210° C., 225° C., 240° C., 250° C., and 260° C. for several different as-received tempers. The artificial aging times included as-received (AR) and 0.5, 1.0, 2.0, 3.0, 4.0, 5.0, and 6.0 hours. As shown in the table, many of the age hardening processes including temperatures of 225° C. and 240° C. and times of 1 to 6 hours produced age hardened alloys having a yield strength of at least 200 MPa and a bendability ratio (r/t) of 0.3 or less.

Figure 16:
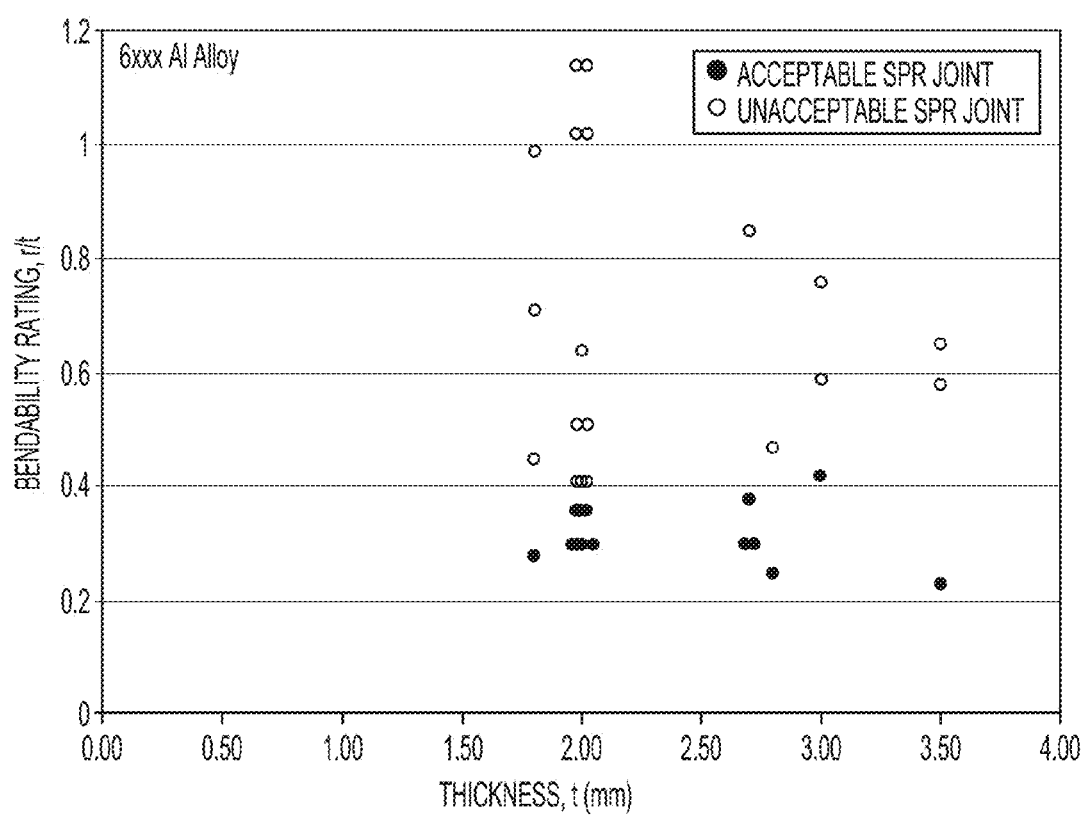
FIG. 16 is a data plot of bendability vs. thickness for 6111 alloy members joined with SPRs and the acceptability of the rivet joint.

With respect to FIG. 16, a data plot is shown for numerous samples of 6111 alloy sheets having a range of r/t ratios and sheet thicknesses. The sheets were joined to another sheet by self-piercing rivets to form a stack. Each SPR was analyzed for quality and a determination was made whether the rivet was acceptable or unacceptable based on factors such as cracking (e.g., in the stack or in the button), separation of the bottom layer, gaps in the stack, buckling of rivet legs, and others. As shown in FIG. 16, for all thicknesses tested (1.75 to 3.5 mm), sheets of 6111 alloy having a maximum r/t (bendability) ratio of 0.4 and under were able to be successfully joined using SPRs. Almost all SPRs of sheets having an r/t ratio of over 0.4 were determined to be unacceptable. The bendability was determined using a semi-guided wrap-bend tester that adheres to the ASTM E290 and FLTM BB114-02 standards. Bendability was defined and measured per FLTM BB 114-02 and the r/t ratio was calculated based on a bend rating of 5.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. Further disclosure regarding heat treatment and/or bendability of aluminum alloys may be found in commonly owned U.S. Pat. No. 8,496,764; U.S. patent application Ser. No. 14/055,476; and U.S. application Ser. No. 13/928,580; the disclosures of which are hereby incorporated in their entirety by reference herein.

What is claimed is:

1. An assembly comprising:
   a first member including a 6111 aluminum alloy heat treated to have a yield strength of at least 200 MPa and an r/t ratio of up to 0/10.3, the 6111 aluminum alloy including 0.5 to 1 weight % magnesium, 0.6 to 1.1 weight % silicon, 0.5 to 0.9 weight % copper, 0.1 to 0.45 weight % manganese, up to 0.4 weight % iron, up to 0.15 weight % zinc, up to 0.1 weight % chromium, up to 0.1 weight % titanium and other elements up to 0.05 weight % each up to 0.15 weight % total, with the balance being aluminum, the 6111 aluminum alloy has been heat treated to a T8 temper; and
   a self-piercing rivet (SPR) securing the first member to one or more additional members.

2. The assembly of claim 1, wherein the SPR maintains intimate contact with the 6111 aluminum alloy.

3. The assembly of claim 1, wherein a plurality of SPRs secure the first member to one or more additional members.

4. The assembly of claim 1, wherein a button formed by the SPR is formed in the 6111 aluminum alloy.

5. The assembly of claim 4, wherein there is substantially no cracking in the button.

6. The assembly of claim 1, wherein the 6111 aluminum alloy has been heat treated to have a yield strength of at least 260 MPa.

7. The assembly of claim 1, wherein the first member and the one or more additional members are each formed of a 6111 aluminum alloy heat treated to have a yield strength of at least 200 MPa and an r/t ratio of up to 0.3.

8. The assembly of claim 1, wherein the first member and the one or more additional members are vehicle body panels.

9. A pickup truck body member joint comprising:
   a first member including a 6111 aluminum alloy heat treated to have a yield strength of at least 200 MPa and an r/t ratio of up to 0.4, the 6111 aluminum alloy including 0.5 to 1 weight % magnesium, 0.6 to 1.1 weight % silicon, 0.5 to 0.9 weight % copper, 0.1 to 0.45 weight % manganese, up to 0.4 weight % iron, up to 0.15 weight % zinc, up to 0.1 weight % chromium, up to 0.1 weight % titanium and other elements up to 0.05 weight % each up to 0.15 weight % total, with the balance being aluminum, the 6111 aluminum alloy has been heat treated to a T8 temper; and
   one or more additional members secured to the first member with a self-piercing rivet (SPR), the SPR extending through the one or more additional members and maintaining intimate contact with the 6111 aluminum alloy.

10. The joint of claim 9, wherein a button is formed in the 6111 aluminum alloy and the SPR terminates in the button.

11. The joint of claim 10, wherein there is substantially no cracking in the button.

12. The joint of claim 9, wherein the 6111 aluminum alloy has been heat treated to have a yield strength of at least 260 MPa.

13. The joint of claim 9, wherein the first member and the one or more additional members are pickup truck body panels.

14. The joint of claim 9, wherein the one or more additional members are secured to the first member with a plurality of SPRs, each SPR extending through the one or more additional members and maintaining intimate contact with the 6111 aluminum alloy.

15. The joint of claim 9, wherein the first member and the one or more additional members are each formed of a 6111 aluminum alloy heat treated to have a yield strength of at least 200 MPa and an r/t ratio of up to 0.3.

* * * * *